Oct. 29, 1957  H. B. LEVITZ ET AL  2,811,111
MACHINERY TRAILER FOR A MOBILE SHOP
Filed Dec. 7, 1950  5 Sheets-Sheet 4
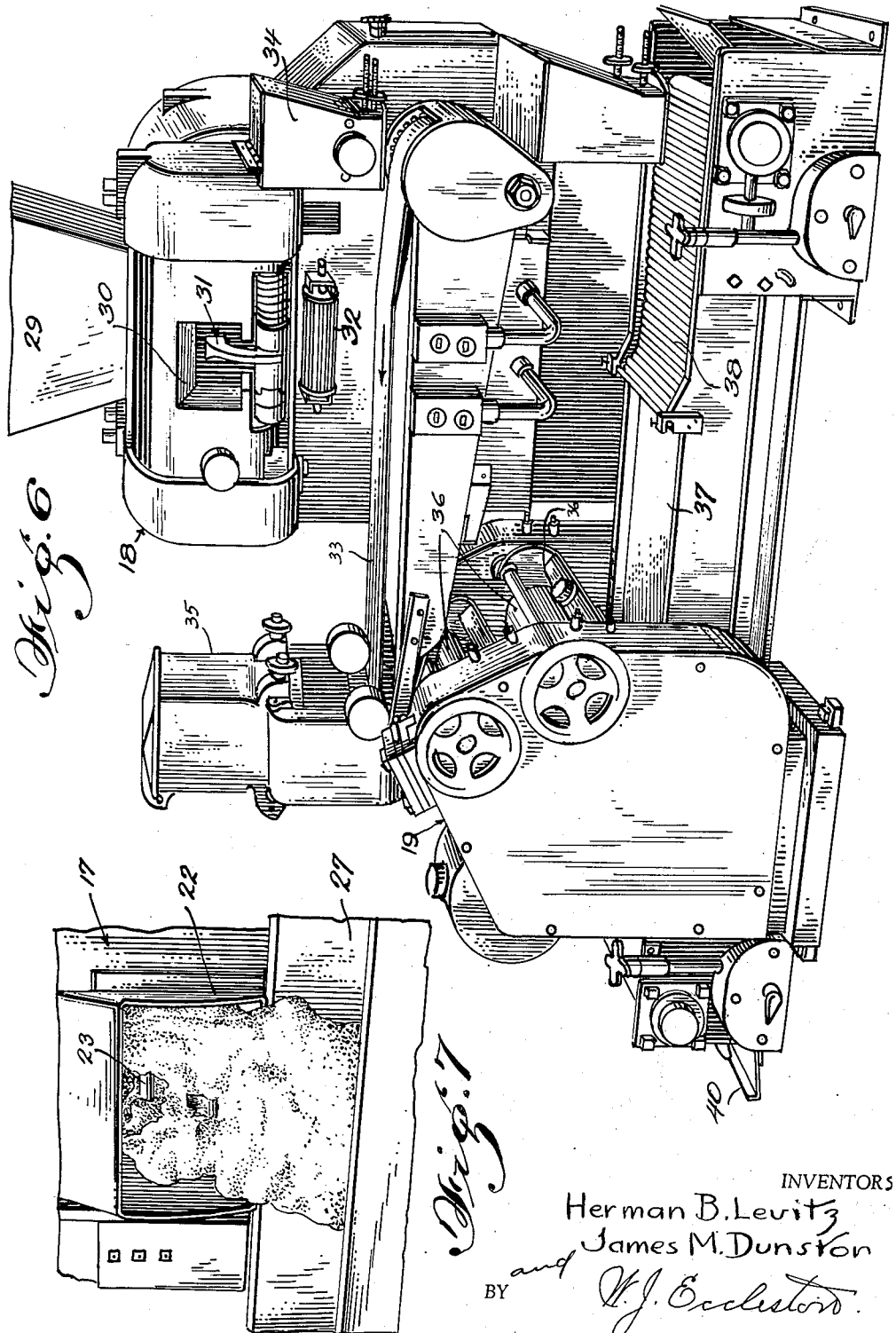
INVENTORS
Herman B. Levitz
James M. Dunston
BY
ATTORNEY

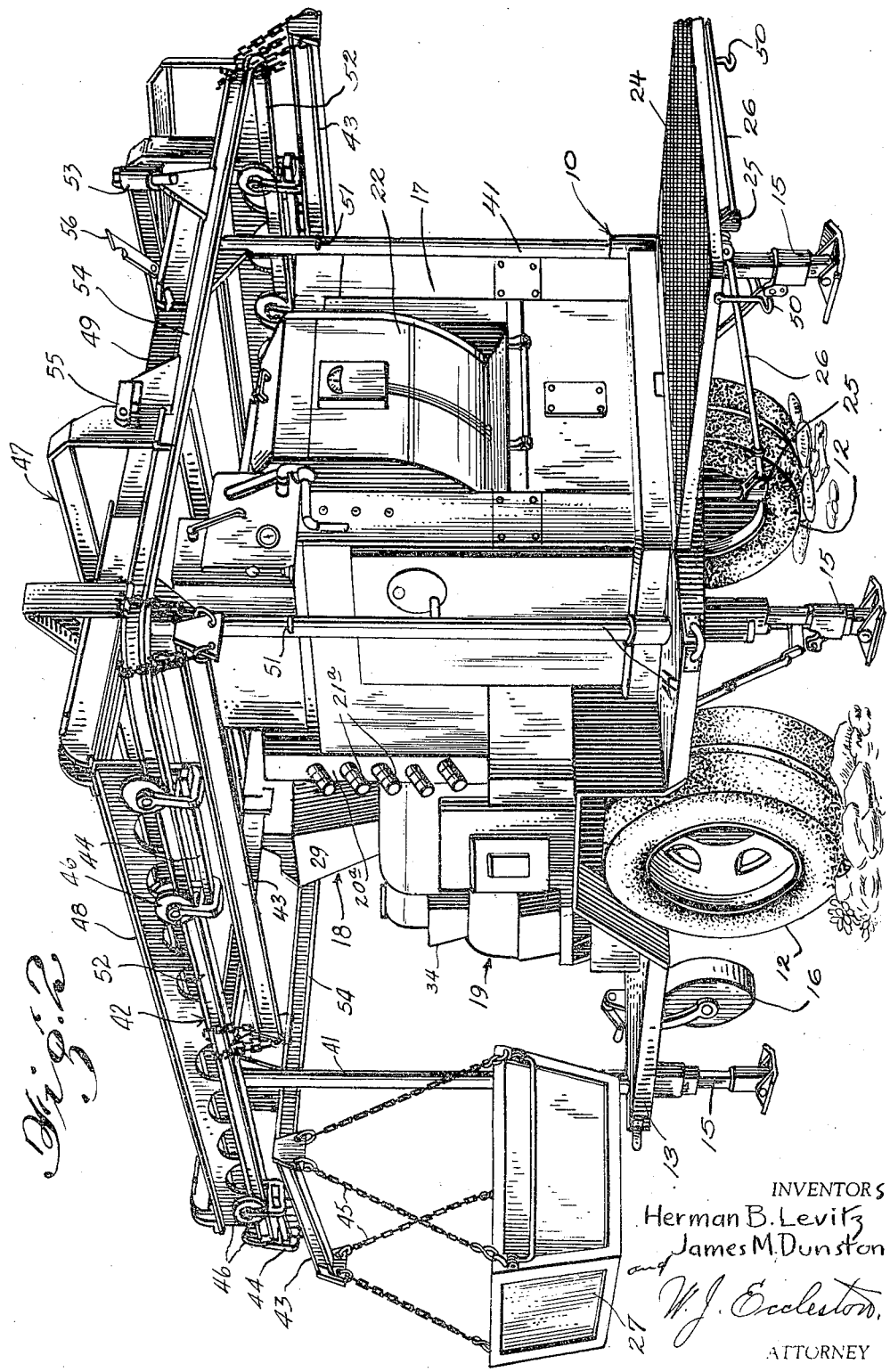

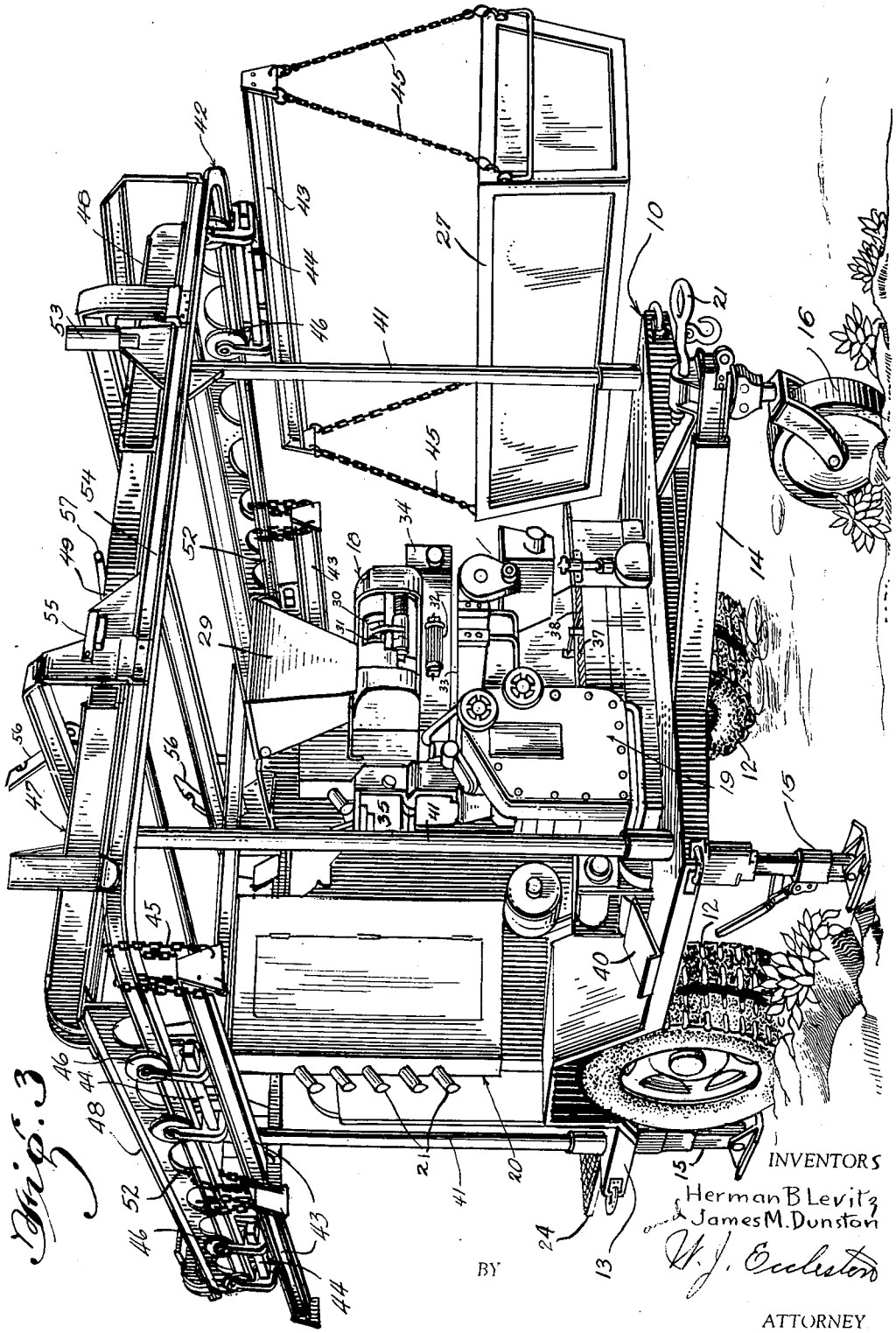

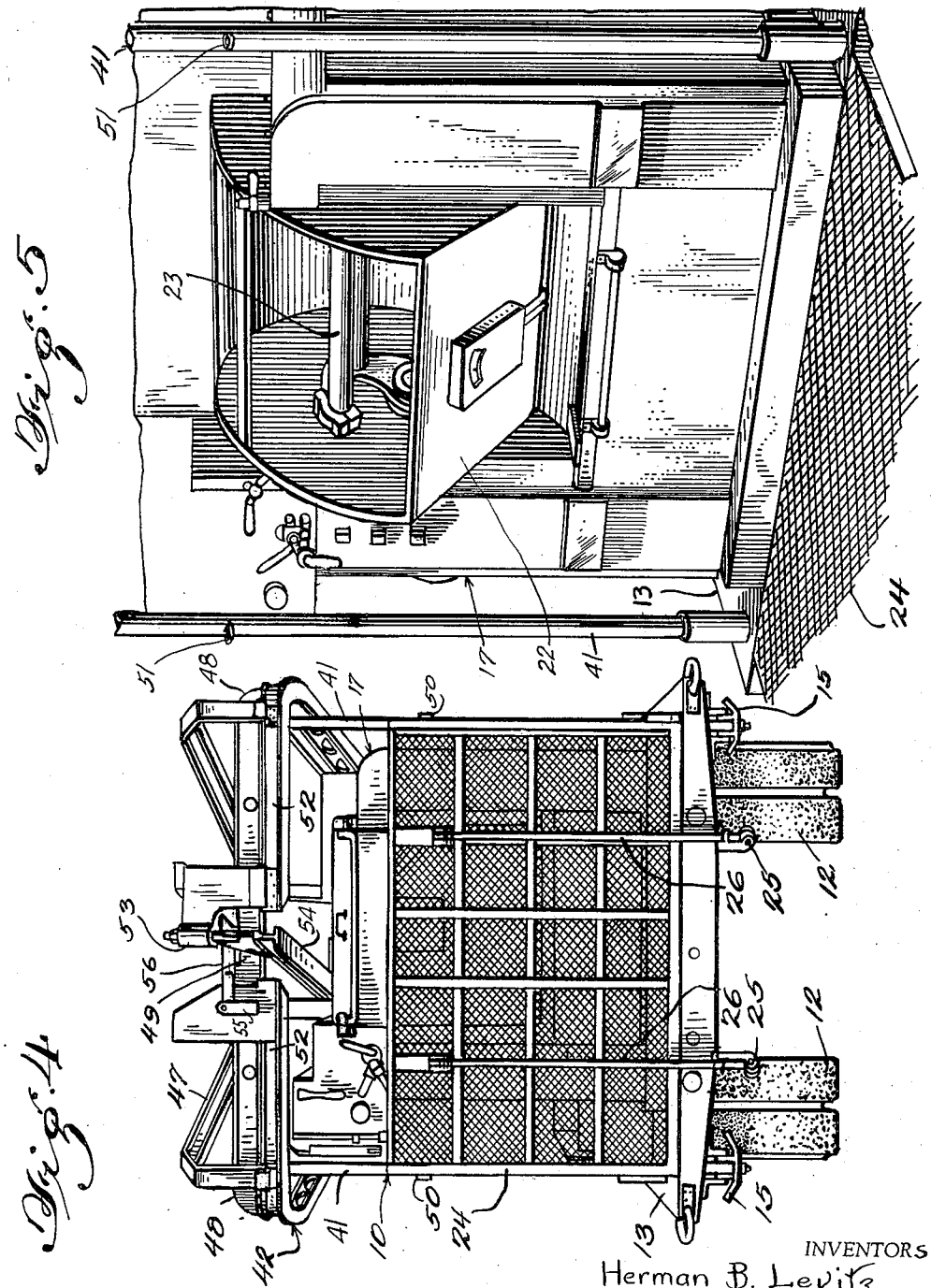

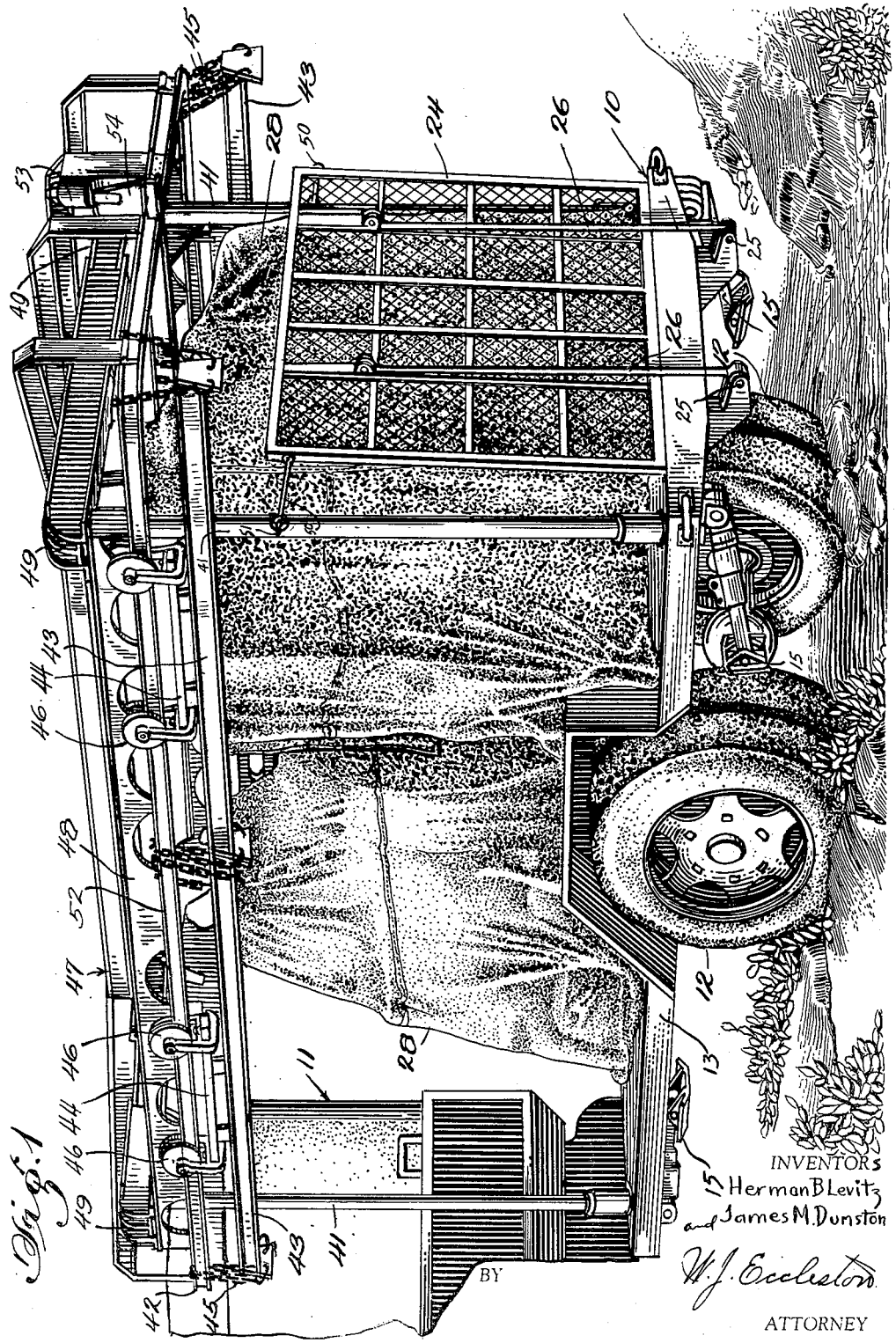

United States Patent Office 2,811,111
Patented Oct. 29, 1957

2,811,111

MACHINERY TRAILER FOR A MOBILE SHOP

Herman B. Levitz, Silver Spring, Md., and James M. Dunston, Jeffersonville, Ind.

Application December 7, 1950, Serial No. 199,694

3 Claims. (Cl. 104—126)

(Granted under Title 35, U. S. Code (1952), sec. 266)

The invention described herein, if patented, may be manufactured and used by or for the Government for governmental purposes, without the payment to us of any royalty thereon.

Our invention relates to mobile shops and more particularly to such shops which are mounted on a trailer of a motor vehicle. Specifically, the device disclosed hereinafter is directed to the machinery trailer for a mobile bakery but is obviously capable of being used with other machinery to provide a mobile shop of a different character.

Modern bakeries utilize mechanical power driven dough mixers, dough dividers, dough rounders and dough molders in that order. Thus, dough is mixed, removed from the mixer for a period of fermentation, is fed into a divider for division into lumps of uniform size and weight and such lumps are then fed successively into a dough rounder where they are given a preliminary shape. Then after a short proofing period, the dough pieces are fed successively to a molder which forms each lump first into a sheet and then into a molded dough piece of proper size and shape. Thereafter the dough pieces are panned and proofed for a predetermined period in a proofing chamber and finally baked in an oven. For convenience in handling, the mixed dough is usually transported from mixer to divider in dough troughs which may be suspended from bogies operating on overhead trackways. If necessary, the dough lumps or pieces may likewise be transported in the dough troughs from divider to molder; from molder to proofing chamber; from proofing chamber to oven and from oven to storage.

While it is possible to include a dough rounder, proofing chamber, oven and storage chamber on the same trailer which mounts the mixer, divider and molder, the specific embodiment of the invention herein disclosed is restricted to an arrangement of mixer, divider and molder together with means for transporting dough troughs about the trailer to the several work stations thereon.

With the foregoing in view, it is an object of our invention to provide an improved machinery platform for a mobile shop.

A further object is to provide an improved machinery arrangement for a mobile shop together with means for transporting work pieces from station-to-station of said shop.

A further object is to provide in combination with a mobile shop including a machinery platform, a plurality of work stations facing outwardly of the platform, an overhead monorail track extending entirely around the platform for transporting work pieces from station-to-station.

A further object is to provide in a device such as that last described, means for retracting said track from an outboard operative position in concentric outboard relation to the platform to a retracted, inoperative or travelling position in substantially inboard concentric relation to the platform.

A further object is to provide a novel machinery trailer for a mobile bakery including a work platform having running gear, a dough mixer, dough divider and dough molder on said platform facing outwardly thereof in different directions, an overhead track on said trailer for transporting dough troughs therearound from station-to-station, and said track being retractable from an operative position to a travelling position.

Other objects and advantages reside in the particular structure of the invention, combination and arrangement of the several parts thereof and in the particular mode of operation, all of which will be readily apparent to those skilled in the art upon reference to the drawing in connection with the following specification wherein the invention is shown, described and claimed.

In the drawing:

Figure 1 is a perspective view of one embodiment of the invention, the parts being shown in the travelling positions;

Figure 2 is a view like Figure 1, the parts being shown in the operative positions;

Figure 3 is a perspective view taken from the opposite end of the device, the parts being shown in the operative positions;

Figure 4 is a rear view of the device with the parts in the travelling positions;

Figure 5 is a perspective view of the dough mixer apart from the rest of the structure;

Figure 6 is a perspective view of the dough divider and dough molder apart from the rest of the structure;

Figure 7 is a fragmentary perspective view of the dough mixer during a dough dumping operation.

Referring specifically to the drawing, wherein like reference characters have been used throughout the several views to designate like parts, 10 designates generally the vehicle embodying the invention which in this form is a trailer adapted to be hauled by any suitable tractor 11, Figure 1. The trailer comprises any suitable running gear 12 which supports a work platform 13. The front end of the trailer 10 is provided with any suitable draw bar means 14 (Figure 3) which may have the usual vertically adjustable caster wheel 16. Each corner of the platform 13 is provided with a retractable jack 15 of well-known form for supporting the platform in a horizontal operative position. Figures 2 and 3 show the jacks 15 in the operative position, while Figures 1 and 4 show them in the retracted or travelling position. As so far described, the trailer 10 is conventional and forms no part of our invention apart from the combination.

The work platform 13 has fixed thereon a dough mixer 17, a dough divider 18 and a dough molder 19 which are so disposed on the platform as to face outwardly thereof in different directions. Thus, the mixer 17 is located at the rear of the platform and faces rearwardly. The divider 18 is disposed centrally of the platform and faces laterally thereof. The molder 19 is located at the front of the platform 13 and faces forwardly. The platform 13 also includes electric light and power control boxes 20 and 20ᵃ which are preferably accessible from the sides of the trailer. If desired, the control boxes may be combined into one dual purpose control box. The boxes 20 and 20ᵃ are provided with suitable connections 21, 21ᵃ for connecting the trailer to a suitable source of electric energy and also connecting the control boxes to other units of the bakery, not shown, such as an oven, proofing chamber and so on.

The structure of the mixer 18, divider 19 and molder 20 are conventional and form no part of the invention apart from the combination. Hence, the description of these elements will be limited to the minimum features necessary for an understanding of the operation of the several work stations.

Thus, the mixer 17 includes a mixing bowl 22 which is pivotally mounted for movement to and from the closed or mixing position of Figure 2 to the open or filling position of Figure 5. The bowl 22 is provided with any suitable power-driven agitator 23 for mixing the dough. Dough ingredients are placed in the bowl 22 when the same is open (Figure 5) and, of course, the mixing of the dough occurs when the bowl 22 is in the closed position of Figure 2. Thereafter, the bowl is opened beyond the Figure 5 position to the dumping position of Figure 7 wherein the mixed dough is dumped into a dough trough 27. This is accomplished by causing the agitator 23 to be driven at a slow speed throughout the dumping movement or by manually jogging the agitator.

The platform 13 is preferably provided with a tail gate 24 which is hingedly secured thereto by any suitable hinge means 25 and associated braces or struts 26. In the operative position of Figures 2 and 3, the gate 24 provides an extension of the platform 13 rearwardly of the mixer 17. In the travelling position of Figures 1 and 4, the gate 24 folds upwardly across the rear of the mixer 17 and is secured in such position by any suitable releasable latch means, such as the hooks 50 on the gate 24 and the eyes 51 on the rear pillars 41. When in the travelling position, the mixer, molder and divider may be covered with any suitable covers 28, Figure 1.

The divider 18 includes a hopper 29 which receives mixed dough. Thereafter, conventional and well-known dough dividing apparatus, not shown, successively forces measured amounts of dough into pocket 30 of a divider cylinder. A piston 31 then discharges the dough lump or piece thus formed downwardly onto a drop off cage wheel 32 which guides the dough lump onto the center of the upper run of an endless conveyor 33. The upper run of the conveyor 33 is moving in the direction of the arrow, Figure 6, whereby the dough lumps are fed to the molder 19 in spaced relation. The dough lumps are prevented from sticking to the conveyor 33 by a flour duster 34 which continually dusts the conveyor 33 with flour.

If rounding or intermediate proofing of the dough pieces is desired, the dough pieces may be loaded into a dough trough and transported away from the molder. After rounding and proofing they may be returned to the conveyor 33 and fed into the molder 19.

The molder 19 includes a flour duster 35 and several driven sheeting rolls 36 which roll each dough lump into a thin sheet. The sheeted dough is then discharged onto the upper run of a conveyor belt 37 which passes below a conventional curling screen 38 which rolls each dough sheet into a loose roll in a well-known manner. Thereafter, the lower run, not shown, of the conveyor belt 37 returns the dough roll by rolling it over a conventional pressure board (not shown) to form the roll into a moulded dough piece which is eventually discharged onto a discharge plate 40. The moulded dough pieces may then be panned and transported to a proofing trailer or cabinet not shown.

Thus, it is apparent that mixed dough must be transported from the mixer 17 at the rear of the trailer to the divider 18 at the left side of the trailer, and is eventually discharged as molded pieces at the right side of the trailer, being transported across the front of the trailer by the molder apparatus. Moreover, after mixing there is a period of fermentation before dividing whereby a number of batches of dough may be mixed and allowed to ferment prior to any operation of the divider. With this in view, there has been provided means for transporting the dough troughs 27 from station-to-station and to storage areas about the trailer.

Such means comprises in the embodiment illustrated, four pillars or other rigid supports 41 on the platform 13 which support any suitable frame 47 which in turn supports a closed monorail track 42 above the platform and in concentric relation thereto and to the mixer, divider and molder. The track 42 is preferably extensible and retractable in the manner shown and described in the copending application of Maurice G. Rosenthal, deceased; Serial No. 208,408, filed January 29, 1951, now abandoned. Thus, in Figures 1 and 4 the track 42 is shown in the retracted or travelling position while in Figures 2 and 3 it is shown in the extended or operative position.

In brief, the frame 47 may comprise a pair of movable frame sections 48 which are laterally movable on rigid transverse rails 49 one of which connects the front pair of pillars 41 together and the other of which connects rear pair together. Each frame section 48 supports a track section 52 for movement therewith. The track sections 52 may be substantially U-shaped and are disposed with the legs thereof in opposed and aligned relation. Each track section 52 has hinged thereto by any suitable hinge means 53, a track extension section 54, there being a section 54 at each end of trailer. With the track sections 52 moved laterally to their outermost limits, the track extension sections 54 are swung outwardly from the Figures 1 and 4 travelling positions to the operative positions of Figures 2 and 3 where they connect together the free ends of the legs of the track sections 52. Suitable latches 55 lock extension sections 54 in the operative position. Release of latches 55 permits the extension sections 54 to be swung to the travelling position of Figures 1 and 4 and likewise releases the frame sections 48 for laterally inward movement to such travelling position. Suitable latches 56 engage fixed detents 57 on rails 49 to lock the frame sections 48 in the travelling position. It is understood likewise that suitable fastening means, not shown, secures the track extension sections 54 in the travelling position.

The dough troughs 27 are preferably detachably secured to chains or the like 45 which depend from carriers 43. Each carrier 43 is part of a bogie or truck 44 which rolls on the track 42 by wheels 46 the frames of which are pivoted to the bogies 44 by vertical pivots to permit the bogies to negotiate the corners.

It is apparent from the foregoing that an empty dough trough 27 may be filled with dough from the mixer 17 as shown in Figure 7 and thereafter moved out of the way for fermentation while other troughs are filled. Thereafter, the troughs may be successively moved to the divider where the dough is manually fed into the hopper 29. Empty troughs may then be successively moved to the region of the discharge plate 40 to receive the molded loaves or pans containing the same.

The troughs 27 when not in use are carried in the tractor 11 and are constructed so as to nest within each other to conserve space. In the travelling position the chains 45 are looped about the track 42 in the storage position not only to anchor the chains but also to secure the carriers 43 and bogies 44 against movement. Of course, the chains, carriers and bogies may be removed in transit and carried in the tractor 11.

While the arrangement shown is for a unit of a mobile bakery, it is obvious that the same is equally applicable to other types of mobile shops merely by substituting other machinery or work stations for the mixer, divider and molder. Thus, the troughs 27 or like work piece carriers could be utilized to transport work pieces from station-to-station about the trailer irrespective of the type of shop mounted on the platform 13. Moreover, while we have shown and described what is now thought to be the preferred form of our invention, it is to be understood that the same is susceptible of other forms and expressions. Consequently, we do not limit ourselves to the precise structures and combinations shown and described hereinabove except as hereinafter claimed.

We claim:

1. In a machinery trailer for a mobile shop including a platform having front and rear ends and opposite sides, running gear, and a plurality of machines on said platform; the improvement comprising a closed monorail track formed from a plurality of track sections, support means mounting said sections on said platform in overhead relation to the same and to said machines, said sections normally being disposed in extended operative positions wherein said sections provide a closed track extending entirely around said platform outwardly of said ends and sides, and means for moving said sections relative to said platform to disjointed traveling positions laterally inwardly of said opposite sides of said platform.

2. In a machinery trailer for a mobile shop including a platform having opposite sides, running gear, and a plurality of machines on said platform; the improvement comprising a closed monorail track formed from a plurality of track sections, support means mounting said sections on said platform in overhead relation to the same and to said machines, said sections including two side sections extending longitudinally of said opposite sides of said platform, all of said sections being disposed normally in extended operative positions wherein said sections provide a closed track extending entirely around said platform outwardly of the same, means for moving all of said sections from said operative positions to disjointed traveling positions, and said traveling positions of said side sections being laterally inwardly of said opposite sides of said platform.

3. In a machinery trailer including a platform having opposite sides, running gear, and a plurality of machines on said platform; the improvement comprising a closed monorail track formed from a plurality of track sections, support means mounting said sections on said platform in overhead relation to the same and to said machines, all of said sections being normally disposed in extended operative positions forming a closed track extending entirely around said platform with at least two of said sections disposed laterally outwardly of said opposite sides of said platform, and means for moving all of said sections relative to said platform from said operative positions to disjointed traveling positions laterally inwardly of said opposite sides of said platform.

References Cited in the file of this patent

UNITED STATES PATENTS

| | | |
|---|---|---|
| 489,003 | Heidelberg | Jan. 3, 1893 |
| 1,444,025 | Copp | Feb. 6, 1923 |
| 1,614,769 | Amsler | Jan. 18, 1927 |
| 1,729,449 | Nagy | Sept. 24, 1929 |
| 1,773,540 | Moss | Aug. 19, 1930 |
| 2,337,615 | McLaren | Dec. 28, 1943 |
| 2,358,446 | Couse | Sept. 19, 1944 |
| 2,382,194 | Wood | Aug. 14, 1945 |

FOREIGN PATENTS

| | | |
|---|---|---|
| 657,513 | France | Jan. 14, 1929 |
| 816,520 | France | May 3, 1937 |
| 395,411 | Great Britain | July 17, 1933 |
| 539,090 | Great Britain | Aug. 27, 1941 |

OTHER REFERENCES

Scientific American, October 27, 1917, page 314.

The J. H. Day Co. Bulletin No. 272, Cincinnati 22, Ohio, pages 9, 11, 12, 16. Copy in Division 20.